United States Patent [19]

Langley et al.

[11] Patent Number: 5,250,111
[45] Date of Patent: Oct. 5, 1993

[54] PIGMENT COMPOSITIONS

[75] Inventors: Robert Langley, Newton Mearns; Michael D. McFarland, Houston, both of Scotland

[73] Assignee: Ciba-Geigy Corporation, Ardsley, N.Y.

[21] Appl. No.: 863,634

[22] Filed: Apr. 6, 1992

[30] Foreign Application Priority Data

Apr. 11, 1991 [GB] United Kingdom ............. 9107651

[51] Int. Cl.$^5$ ............ C09D 11/02; C09B 47/16; C09B 47/24; C09B 69/00
[52] U.S. Cl. .................. 106/411; 106/410; 106/20 R; 106/23 R; 106/23 D; 106/23 H; 540/123; 540/130; 540/135; 540/136; 540/140
[58] Field of Search ............ 106/410, 411, 20 R, 106/23 R, 23 D, 23 H; 540/123, 130, 135, 136, 140

[56] References Cited

U.S. PATENT DOCUMENTS

| | | | |
|---|---|---|---|
| 2,761,868 | 9/1956 | Lacey | 540/123 |
| 2,855,403 | 10/1958 | McKellin et al. | 540/123 |
| 3,037,030 | 5/1962 | Eisele et al. | 540/130 |
| 3,055,895 | 9/1962 | Joyce et al. | 544/217 |
| 3,973,981 | 8/1976 | Miyatake et al. | 106/411 |
| 4,665,165 | 5/1987 | Wald | 540/124 |

FOREIGN PATENT DOCUMENTS

| | | |
|---|---|---|
| 0087713 | 1/1986 | European Pat. Off. |
| 1029965 | 7/1955 | Fed. Rep. of Germany |
| 3400161 | 7/1984 | Fed. Rep. of Germany |
| 2281409 | 3/1976 | France |
| 695523 | 8/1953 | United Kingdom |
| 717137 | 10/1954 | United Kingdom |
| 806175 | 12/1958 | United Kingdom |
| 949739 | 2/1964 | United Kingdom |
| 2009205 | 6/1979 | United Kingdom |

OTHER PUBLICATIONS

Chemical Abstracts 71, 4509m, 1969 Kemmocki et al. 10 Feb. 1969.
Chemical Abstracts 63, 5796a-d, May 11, 1964.

*Primary Examiner*—Mark L. Bell
*Assistant Examiner*—Scott L. Hertzog
*Attorney, Agent, or Firm*—George R. Dohmann

[57] ABSTRACT

A pigment composition comprising a) a pigment; and b) a phthalocyanine compound having the formula I:

$$MPc(CH_2NHCO—A)_n \qquad I$$

in which Pc represents a phthalocyanine residue which is optionally further substituted by up to an average of one chlorine or bromine atom or by a sulphonic acid group; M is hydrogen or a metal capable of forming a metal phthalocyanine; n is a number ranging from 0.1 to 4.0; and A is $C_3$–$C_{21}$ alkenyl, $C_5$–$C_8$ cycloalkyl, $C_7$–$C_{11}$ aralkyl, $C_6$–$C_{10}$ aryl, a 5- or 6-membered heterocyclic residue or a fused heterocyclic system.

16 Claims, No Drawings

PIGMENT COMPOSITIONS

The present invention relates to pigment compositions, in particular to pigment compositions containing, as anti-flocculation additives, phthalocyanine derivatives.

The use of phthalocyanine derivatives as anti-flocculation additives for pigments, in particular phthalocyanine pigments is already known.

For example, in GB 949739 non-flocculating phthalocyanine preparations are described which contain, as the relevant stabilizing agent, phthalocyanine compounds having the formula:

in which Pc is an m-valent phthalocyanine residue; $R^1$ and $R^2$, independently, are hydrogen or an optionally substituted aliphatic residue, or the group $-NR^1R^2$ is a heterocyclic residue; and m is 1,2,3 or 4.

In GB 2009205A, phthalocyanine pigment compositions are disclosed comprising a) a phthalocyanine pigment; b) as anti-flocculation additive, inter alia, a compound having the formula:

in which Pc is the n-valent residue of a metal-free or metal phthalocyanine; $R^1$ is hydrogen, alkyl, cycloalkyl, hydroxyalkyl, aminoalkyl or aralkyl; $R^2$ is alkyl, cycloalkyl, hydroxyalkyl, aminoalkyl or aralkyl; or $R^1$ and $R^2$ may be combined, with the N-atom, to form a 5-, 6- or 7-membered heterocyclic ring; l is 1,2,3, or 4; and n is 1,2,3,4,5,6,7 or 8; and c) a polyvalent metal salt of an anionic surface-active agent.

In EP 0087713, there are described phthalocyanine preparations, having improved colouristic properties and improved technical properties in application, comprising a) a finely-divided phthalocyanine pigment; and b) at least one phthalocyanine compound having the formula:

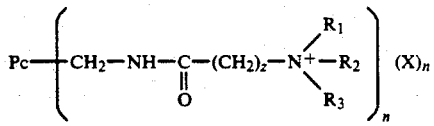

in which Pc is an n-valent phthalocyanine residue, optionally containing up to two chlorine atoms; $R^1$ and $R^2$, independently, are $C_2$-$C_4$ alkyl or $C_2$-$C_4$ hydroxyalkyl; $R_3$ is $C_1$-$C_{14}$ alkyl, $C_2$-$C_4$ hydroxyalkyl, 2-hydroxy-3-chloropropyl or benzyl; X is one equivalent of an anion; z is 1 or 2; and n is 1, 2, 3, or 4.

Another route to non-flocculating phthalocyanine pigments which has been examined, comprises modifying the basic phthalocyanine molecule. In GB 695523, modified phthalocyanine pigments are produced by reacting phthalocyanines with a hydroxymethylimide of formula:

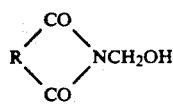

in which R is a divalent radical, e.g. methylene or o-phenylene, resulting in the introduction, into the phthalocyanine molecule, of groups of formula

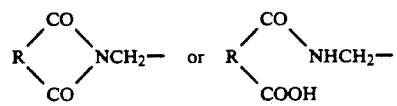

in which R has its previous significance.

In GB 695523, it is stated that such modified phthalocyanines show greatly enhanced resistance to crystallization and flocculation.

This assertion, however, is contradicted in U.S. Pat. No. 2,855,403, e.g. in Example 1 thereof, which states that a reaction product of copper phthalocyanine and methylol-phthalimide containing, on average, one phthalimidomethyl group per molecule of copper phthalocyanine, shows severe flocculation in conventional automotive lacquers.

U.S. Pat. No. 2,855,403 overcomes the flocculation problems associated with the products of GB 695523, by reacting these products further with certain nitrogenous bases having at least two hydrogen atoms on the basic nitrogen atom.

We have now found that pigment compositions, having excellent flow behaviour (non-flocculating) in printing inks, are obtained by incorporating into the base pigment, certain amidomethyl phthalocyanine derivatives.

Accordingly, the present invention comprises a pigment composition comprising a) a pigment; and b) a phthalocyanine compound having the formula:

    I in which Pc represents a phthalocyanine residue which is optionally further substituted by up to an average of one chlorine or bromine atom or of a sulphonic acid, but which is preferably not further substituted; M is hydrogen or a metal e.g. Mg, Al, Ni, Fe, Zn, Pb, Sn or, preferably, Cu capable of forming a metal phthalocyanine; n is a number ranging from 0.1 to 4.0, preferably from 1.0 to 3.0; and A is $C_3$-$C_{21}$ alkenyl, $C_5$-$C_8$ cycloalkyl, $C_7$-$C_{11}$ aralkyl, $C_6$ or $C_{10}$ aryl or a 5- or 6-membered heterocyclic residue or a fused heterocyclic system.

Any pigment having a tendency to flocculate may be employed as component a) of the compositions of the present invention. Thus, the flocculating pigment may be an azo, anthraquinone, quinacridone, isoindolinone, dioxazine or perylene pigment, but is preferably a phthalocyanine pigment e.g. an optionally chlorinated, optionally metal-containing phthalocyanine pigment, especially unsubstituted copper phthalocyanine.

Examples of $C_3$-$C_{21}$ alkenyl groups A include prop-1-enyl, but-1-enyl, hex-1-enyl, hept-1-enyl, 2-propenyl (allyl), but-3-en-1-yl, (2-methyl) prop-2-en-1-yl (isobutenyl), 2,6-dimethyl hept-5-en-1-yl, dec-9-en-1-yl, tridec-8-en-1-yl, pentadec-8-en-1-yl, heptadec-8-en-1-yl, nonadec-10-en-1-yl and heneicos-12-en-1-yl. Preferred alkenyl groups A are pentadec-8-en-1-yl and heptadec-8-en-1-yl.

Examples of $C_5$-$C_8$ cycloalkyl groups are cyclopentyl, cyclohexyl and cyclooctyl, cyclohexyl being preferred.

$C_7$-$C_{11}$ Aralkyl groups A are, principally, benzyl or naphthylmethyl, benzyl being preferred.

$C_6$ or $C_{10}$ Aryl groups A are phenyl or naphthyl, with a preference for phenyl.

5- to 7-Membered heterocyclic residues A include furyl, thienyl, pyrryl, pyrazolyl, pyridyl and pyrazyl, 2-furyl and 3-pyridyl being preferred.

Examples of fused heterocyclic systems A include indolyl, benzofuranyl, benzimidazolyl and quinolyl, especially 3-quinolyl. The cyclic substituents A, namely the cycloalkyl, aralkyl, aryl, heterocyclic and fused heterocyclic substituents, may contain one or more substituent groups, provided that these substituent groups do not impair the flocculation—inhibiting properties of the phthalocyanine compound of formula I. Examples of suitable substituent groups include $C_1$-$C_6$ alkyl groups, such as methyl, ethyl, n-propyl, n-butyl and n-hexyl groups; $C_1$-$C_6$ groups such as methoxy, ethoxy, n-propoxy, n-butoxy and n-hexoxy groups; hydroxy groups; nitro groups; and halogeno groups such as chloro, bromo and iodo groups.

The compounds of formula I are new and, as such, form a further aspect of the present invention.

According to one method, the compounds of formula I may be produced by reacting an aminomethyl phthalocyanine having the formula II:

$$MPc(CH_2NH_2)_n \qquad \mathrm{II}$$

in which M, Pc and n have their previous significance, with an acid halide having the formula III:

$$A-CO-hal \qquad \mathrm{III}$$

in which A has its previous significance and hal denotes a halogen atom, especially a chlorine atom.

The starting materials of formula II and III are known compounds. The compounds of formula II, and their production have been described, e.g. in GB Patent Specification No: 949739; and the acid halides are mostly commercially-available materials.

The compound of formula II should be essentially water-free to obviate hydrolysis of the acid chloride reactant of formula III. If the compound of formula II is initially provided as a presscake, therefore, the water must first be removed, e.g. by azeotropic distillation using a suitable solvent e.g. pyridine.

The anhydrous reactant of formula II may then be reacted with the acid chloride of formula III, under conventional acylation reaction conditions e.g. by initial controlled addition of the acid chloride, preferably in the presence of an agent, conveniently pyridine, used in any initial de-watering treatment, capable of absorbing the hydrogen halide released during the acylation reaction.

The amount of the compound of formula I, present in the pigment compositions of the present invention, conveniently ranges from 0.5 to 20, preferably from 1.0 to 10 parts by weight, based on the pigment component, component a).

Component b) may be combined with component a) of the pigment composition of the invention, during any stage of processing of the latter component.

For example, the processing or conversion of a crude base phthalocyanine into pigmentary form, may be effected by mixing the crude phthalocyanine with component b), and milling the mixture. In a second method of producing a pigmentary phthalocyanine, a base phthalocyanine, component a), may be milled and treated with a polar organic solvent, e.g. isopropanol, which is at least partially water miscible. Component b) may be incorporated at any stage during processing.

The pigment compositions of the present invention may also contain minor amounts, e.g. up to 5% by weight, based on the total pigment composition, of conventional pigment additives e.g. natural resins such as abietic acid or esters thereof.

The pigment compositions of the present invention are particularly suitable for use in the colouration of surface coating media, in particular printing inks, especially publication gravure inks, to which they impart excellent flow (non-flocculating) behaviour.

Accordingly, the present invention also provides a surface coating composition, preferably a printing ink, especially a publication gravure ink, containing an effective colouring amount, preferably from 1 to 20% by weight, especially from 5 to 15% by weight, based on the total surface coating composition, of a pigment composition according to the present invention.

The following Examples further illustrate the present invention. Reactions of the aminomethyl phthalocyanine of formula II may not go fully to completion. Unreacted material may therefore, be present in the reaction product. Such unreacted material, however, has no detrimental effect on the final pigment performance.

In the following examples, the Fourrier-Transform Infra-red spectra of both the starting material, namely $CuPc(CH_2NH_2)_{2.5}$ and each of the compounds of formula I according to the invention, are recorded on a Phillips PU 9800 FTIR Spectrophotometer, as KBr discs between 4000 and 400 cm$^{-1}$. The spectra are used, in conjunction with the IR spectra of each acid chloride starting material (the Aldrich Library of Infrared Spectra, 2nd Edition, C. J. Pouchert), to show that neither starting material is present in large amount in the end product which is, therefore, a new compound of formula I. It should be noted that some acid chloride starting materials are liquids and their spectra are of the neat liquid. Some slight differences can appear between IR spectra of a material in different physical states.

EXAMPLE 1

A. 50 Parts of aminomethyl copper phthalocyanine (containing about 2.5 aminomethyl groups per copper phthalocyanine molecule) are slurried, as a 21% solids presscake, in 750 parts of pyridine for 4 hours. The mixture is heated to boiling and the water-pyridine azeotrope is removed until the slurry is water-free (this requires the addition of pyridine). The mixture is then cooled to room temperature, 80.45 parts of benzoyl chloride are added dropwise, and the stirred slurry is heated under reflux for 20 hours. The reaction mixture is then poured into 7000 parts of stirred cold water, filtered and washed with copious quantities of cold water. 62.2 parts of the product are obtained with a purity (acetone insolubles) of 92%.

The FTIR spectrum of the aminomethyl CuPc starting material and that of the reaction product, CuPc $(CH_2NHCOPh)_{2.5}$, are clearly different. Very strong peaks appear at 1290, 970 and 700 cm$^{-1}$ in the spectrum of the benzamidomethyl-CuPc product but not in that of the aminomethyl-CuPc starting material. A broad peak at 620 cm$^{-1}$ appears only for the aminomethyl-CuPc starting material. Increased IR activity is evident between 1500 and 800 cm$^{-1}$ in the case of the benzamido methyl-CuPc product.

For the benzamidomethyl-CuPc product of Example 1(A), there is a very strong band at 1650 cm$^{-1}$, with two associated bands at 1700 and 1720 cm$^{-1}$, respectively. Strong absorptions between 1600 and 1850 cm$^{-1}$ are strong evidence for, and very characteristic of carbonyl stretching activity, Vc=O. The carbonyl stretching frequency for the acid chloride starting material is 1773 cm$^{-1}$. Aryl acid chlorides in general have a Vc=O between 1750 and 1805 cm$^{-1}$ whilst, in solid state IR, amide carbonyl bands are typically at around 1650 cm$^{-1}$. Accordingly, the product of Example 1(A) is an amide. No such absorbance, with a similar intensity and band shape is present in the spectrum of the aminomethyl-CuPc starting material.

Activity between 1500 and 1700 cm$^{-1}$ in the scan for the aminomethyl-CuPc starting material is indicative of —NH$_2$ bending modes (cf. Spectroscopic methods in Organic Chemistry, 3rd Edition, D. H. Williams and I. Fleming).

The broad carbon-chlorine stretch, Vc-Cl found in the benzoyl chloride starting material at 650 cm$^{-1}$ is absent in the scan of the benzamido methyl-CuPc product of Example 1(A).

The band near it, at ca. 730 cm$^{-1}$, appears in all spectra and is probably CuPc-based. Bands at 1500, 1330 and 1090 cm$^{-1}$ also fall into this category.

In the aminomethyl-CuPc and the benzamido methyl-CuPc product scans there is little activity above 2000 cm$^{-1}$, apart from a broad peak for various carbon-hydrogen stretches. These are mainly CuPc-based and thus appear in both the aminomethyl-CuPc and benzamidomethyl-CuPc scans. This band masks —NH stretching in the amine and the amide scans. Two small peaks at about 3000 cm$^{-1}$ have moved +100 cm$^{-1}$ in the case of the benzamidomethyl-CuPc product of Example 1(A).

3.4 Parts of the above purified product and 68.8 parts of copper phthalocyanine are dry-milled together in a VIBRATOM 0.6 litre mill pot, containing 2315 parts 1.27 cm steel balls and 530 parts roofing felt tacks, for 3 hours and 20 minutes. The pigment powder is discharged through an Endecotts sieve pan.

| C. | Phenolic modified rosin: toluene, 1:1 | 24 Parts |
|---|---|---|
| | Toluene | 20 Parts |
| | Pigment powder from Example 1B | 6 Parts |
| | Glass beads (2 mm diameter) | 41.5 Parts | are charged to a 113.4 g jar and rotated on rollers at room temperature for 16 hours and 50 minutes at 150 rpm. After ballmilling, the sample jar is shaken vigorously for 15 seconds and the millbase decanted into a No. 3 Shell until full. The millbase discharges from the Shell rapidly and without a break in the flow.

EXAMPLE 2

A. 20 Parts of aminomethyl copper phthalocyanine (containing about 2.5 aminomethyl groups per copper phthalocyanine molecule) are slurried, as a 20% solids presscake, in 300 parts of pyridine for 4 hours. The mixture is heated to boiling and the water-pyridine azeotrope is removed until the slurry is water free (this requires the addition of pyridine). The mixture is then cooled to room temperature, 35.4 parts of 4-methylbenzoyl chloride are added dropwise, and the stirred slurry is heated under reflux for 20 hours. The reaction mixture is then poured into 3000 parts of stirred cold water, filtered and washed with copious quantities of cold water. 35.84 parts of the product are obtained. Purification of the material with acetone results in losses due to product solubility.

The FTIR spectrum of the product of Example 2(A) is virtually superimposable on that of the product of Example 1(A), in terms of band shape, position and relative intensity. Some peaks, namely those at 830 and 600 cm$^{-1}$ appear only in the spectrum of the product of Example 2(A). These differences are due to a change in symmetry in a mono-substituted benzene ring. Most importantly, the differences between the FTIR spectrum of the toluamidomethyl-CuPc products of Example 2(A) and those of the respective aminomethyl-CuPc and toluyl chloride starting materials, are clear.

B. 6.7 Parts of the above purified product and 68.8 parts of copper phthalocyanine are dry-milled together according to the method described in Example 1.B.

C. 96 Parts Phenolic modified rosin: toluene (1:1) and 80 parts toluene are charged to a 500 parts capacity water cooled pot. 24 parts of the pigment powder from Example 2B are added in with stirring (High Speed Stirrer fitted with dispersion head). The mixture is pre-mixed at 4000 rpm for 15 minutes. The disperser head is replaced with a triple disc impeller, water-cooling is applied, and 320 parts of glass beads (2 mm diameter) are added into the pot. The mixture is beadmilled for 30 minutes at 2000 rpm then decanted into a No: 2 Zahn Cup until full. The millbase discharges rapidly from the cup and without a break in flow.

EXAMPLE 3

A. 18 Parts of aminomethyl copper phthalocyanine (containing about 1 aminomethyl group per copper phthalocyanine molecule) are slurried, as a 18% solids presscake, in 300 parts of pyridine for 4 hours. After removal of the azeotrope 26.9 parts of 2-furoyl chloride are added and the stirred slurry is boiled for 20 hours. The drowned-out material is filtered and washed pyridine-free with cold water. Yield is 24.24 parts. Purity is 94.5%.

The FTIR spectrum of the product of Example 3(A) is similar to that of the product of Example 1(A). CuPc-based peaks are shown at 1510, 1330, 1280, 1175, 1135, 1100 and 740 cm$^{-1}$. The presence of the new furamidomethyl-CuPc compound is confirmed by the position and presence of the carbonyl band.

B. 5.32 parts of the product from 3A, and 67 parts of copper phthalocyanine are dry-milled together, according to the method described in Example 1B.

| C. | Phenolic modified rosin: toluene, 1:1 | 48 parts |
|---|---|---|
| | Toluene | 40 parts |
| | Pigment powder from Example 3B | 12 parts |
| | Steatite balls (10 mm diameter) | 200 parts | are charged to a 454 g jar and rotated on rollers for 16 hours at 115 rpm. After milling, the sample jar is decanted into a No 2 Zahn Cup. The millbase shows excellent flow properties when discharged from the Zahn Cup.

EXAMPLE 4

A. 19.3 Parts of aminomethyl copper phthalocyanine (containing about 1 aminomethyl group per copper phthalocyanine molecule) are reacted with 39.34 parts of nicotinoyl chloride hydrochloride according to the method of Example 3A. 25.98 parts of the product are obtained with a purity (acetone insolubles) of 95.2%.

The FTIR spectrum of the product of Example 4(A) is similar to that of the product of Example 1(A). CuPc-based peaks are present at 1510, 1330, 1280, 1175, 1135, 1100 and 740 cm$^{-1}$. The presence of the new nicotinamidomethyl-CuPc compound is confirmed by the presence and position of the carbonyl band.

B. 5.28 Parts of the product from 4A and 67 parts of copper phthalocyanine are dry-milled together according to the procedure in Example 1B.

| C. | Phenolic modified rosin: toluene, 1:1 | 24 parts |
|----|---------------------------------------|----------|
|    | Toluene                               | 20 parts |
|    | Pigment powder from Example 4B        | 6 parts  |
|    | Glass beads (2 mm diameter)           | 41.5 parts | are charged to a 113.4 g jar and rotated on rollers at room temperature for 16 hours and 50 minutes at 150 rpm. After ballmilling the sample jar is shaken vigorously for 15 seconds and the millbase decanted into a No 3 Shell unit full. On discharging from the shell the ink exhibits excellent flow behaviour.

EXAMPLE 5

A. 10 Parts of aminomethyl copper phthalocyanine (containing about 2.5 aminomethyl groups per copper phthalocyanine molecule) are slurried, as a 20.2% solids presscake, in 150 parts of pyridine for 4 hours. The mixture is heated to boiling and the water-pyridine azeotrope is removed until the slurry is water-free. The mixture is then cooled to room temperature, 23.98 parts of 3,5-dichlorobenzoyl chloride are added dropwise, and the stirred slurry is heated under reflux for 20 hours. The reaction mixture is then poured into 1500 parts of stirred cold water, filtered and washed well with water. 16.9 parts of the product are obtained with a purity of 93.4% (by acetone insolubles).

The FTIR spectrum of the product of Example 5(A) is close to that of the product of Example 1(A), but with extra bands due to the disubstituted benzene ring at 1670 and ca. 1000 cm$^{-1}$.

B. 3.4 Parts of the purified product from 5A and 68.8 parts of copper phthalocyanine are dry-milled together by the method of Example 1B.

C. The pigment powder from 5B, when incorporated into an ink system and assessed according to the procedure of Example 1C, exhibits excellent flow behaviour.

EXAMPLE 6

A. 20 parts of aminomethyl copper phthalocyanine (containing about 2.5 aminomethyl groups per copper phthalocyanine molecule) are slurried, as a 22.2% solids presscake, in 300 parts of pyridine for 4 hours. The mixture is heated to boiling and the water-pyridine azeotrope is removed until the slurry is water-free. The mixture is then cooled to room temperature, 33.6 parts of cycohexane carbonyl chloride are added dropwise, and the stirred slurry is heated under reflux for 20 hours. The reaction mixture is then poured into 3000 parts of stirred cold water, filtered and washed well with water. 27.5 parts of the product are obtained with a purity of 87.8% (by acetone insolubles).

The FTIR spectrum of the product of Example 6A is clearly a cyclohexyl compound due to the strong doublet at 2950 cm$^{-1}$, characteristic of this group. The carbonyl band is consistent with an amide at 1700 cm$^{-1}$ and there is no C-Cl activity obvious between 600 and 800 cm$^{-1}$.

B. 7.63 parts of the unpurified product from 6A and 67 parts of cooper phthalocyanine are dry-milled together by the method of Example 1B.

C. The pigment powder from 6B, when incorporated into an ink system and assessed according to the procedure of Example 1C, exhibits excellent flow behaviour.

EXAMPLE 7

A. 20 parts of aminomethyl copper phthalocyanine (containing about 2.5 aminomethyl groups per copper phthalocyanine molecule) are slurried, as a 21.1% solids presscake, in 300 parts of pyridine for 4 hours. The mixture is heated to boiling and the water-pyridine azeotrope is removed until the slurry is water-free. The mixture is then cooled to room temperature, 37.3 parts of caprylol chloride are added dropwise, and the stirred slurry is heated under reflux for 20 hours. The reaction mixture is then poured into 3000 parts of stirred cold water, filtered and washed well with water. The resultant cake was slurried in cold water and dispersed in dilute aqueous potassium hydroxide. This cake was dispersed in 500 parts acetone and sucked dry. 16.2 parts are obtained.

The IR spectrum of the product of Example 7A is clearly different from aminomethyl copper phthalocyanine. The carbonyl band is 75 cm$^{-1}$ lower than for the free acid chloride at 1701 cm$^{-1}$.

B. 3.35 parts of the product from 7A and 67 parts of copper phthalocyanine are dry-milled together by the method of Example 1B.

C. The pigment powder from 7B, when incorporated into an ink system and assessed according to the procedure of Example 1C, exhibits excellent flow behaviour.

EXAMPLE 8

A. 15.9 parts of aminomethyl cooper phthalocyanine (containing about 2.5 aminomethyl groups per copper phthalocyanine molecule) are slurried, as a 22.2% solids presscake, in 238 parts of pyridine for 4 hours. The mixture is heated to boiling and the water-pyridine azeotrope is removed until the slurry is water-free. The mixture is then cooled to room temperature, 20 parts of oleoyl chloride are added dropwise, and the stirred slurry is heated under reflux for 20 hours. The reaction mixture is then poured into 3000 parts of stirred cold water, filtered and washed well with water. 27.9 parts of the product are obtained with a purity of 60.2% (by acetone insolubles).

The FTIR spectrum of the product of Example 8A shows a strong doublet at 2900 cm$^{-1}$ characteristic of oleoyl activity. The position of the carbonyl is consistent with an amide product.

B. 8.35 parts of the purified product from 8A and 67 parts of copper phthalocyanine are dry-milled together by the method of Example 1B.

C. The pigment powder from 8B, when incorporated into an ink system and assessed according to the procedure of Example 1C, exhibits excellent flow behaviour.

EXAMPLE 9

A. 20 parts of aminomethyl copper phthalocyanine (containing about 2.5 aminomethyl groups per copper phthalocyanine molecule) are slurried, as a 22.5% solids presscake, in 300 parts of pyridine for 4 hours. The mixture is heated to boiling and the water-pyridine azeotrope is removed until the slurry is water-free. The mixture is then cooled to room temperature, 35.4 parts of benyl carbonlychloride are added dropwise, and the stirred slurry is heated under reflux for 20 hours. The reaction mixture is then poured into 3000 parts of stirred cold water, filtered and washed well with water. 31.5 parts of the product are obtained with a purity of 62.7% (by acetone insolubles).

The FTIR spectrum of the product of Example 9A shows bands wholly consistent with the presence of an amide.

B. 3.21 parts of the unpurified product from 9A and 67 parts of copper phthalocyanine are dry-milled together by the method of Example 1B.

C. The pigment powder from 9B, when incorporated into an ink system and assessed according to the procedure of Example 1C, exhibits excellent flow behaviour.

We claim:

1. A pigment composition comprising a) a pigment; and b) a phthalocyanine compound having the formula I:

$$MPc(CH_2NHCO-A)_n \qquad I$$

in which Pc represents a phthalocyanine residue which is optionally further substituted by up to an average of one chlorine or bromine atom or by a sulphonic acid group; M is hydrogen or a metal capable of forming a metal phthalocyanine; n is a number ranging from 0.1 to 4.0; and A is $C_3$-$C_{21}$ alkenyl, $C_5$-$C_8$ cycloalkyl, $C_7$-$C_{11}$ aralkyl, $C_6$-$C_{10}$ aryl, a 5- or 6-membered heterocyclic residue or a fused heterocyclic system.

2. A composition according to claim 1 in which the component a) is a phthalocyanine pigment.

3. A composition according to claim 2 in which component a) is unsubstituted copper phthalocyanine.

4. A composition according to claim 1 in which component b) is a compound of formula I in which Pc is a phthalocyanine which is not further substituted.

5. A composition according to claim 1 in which, in the compound of formula I, M is copper.

6. A composition according to claim 1 in which, in the compound of formula I, n ranges from 1.0 to 3.0.

7. A composition according to claim 1 in which the amount of the compound of formula I present is from 0.5 to 20 parts by weight, based on the weight of component a).

8. A composition according to claim 7 in which the amount of the compound of formula I present is from 1.0 to 10 parts by weight, based on the weight of component a).

9. A surface coating composition comprising a binder, a solvent and an effective colouring amount of a pigment composition according to claim 1.

10. A surface coating composition according to claim 9 in which the amount of the pigment composition according to claim 1 is from 1 to 20% by weight, based on the weight of the surface coating composition.

11. A surface coating composition according to claim 10 in which the amount of the pigment composition according to claim 1 is from 5 to 15% by weight, based on the weight of the surface coating composition.

12. A surface coating composition according to claim 9 which is a printing ink.

13. A surface coating composition according to claim 12 which is a publication gravure ink.

14. A compound having the formula I:

$$MPc(CH_2NHCO-A)_n \qquad I$$

in which Pc represents a phthalocyanine residue which is optionally further substituted by up to an average of one chlorine or bromine atom or by a sulphonic acid group; M is hydrogen or a metal capable of forming a metal phthalocyanine; n is a number ranging from 0.1 to 4.0; and A is $C_3$-$C_{21}$ alkenyl, $C_5$-$C_8$ cycloalkyl, $C_7$-$C_{11}$ aralkyl, $C_6$-$C_{10}$ aryl, a 5- or 6-membered heterocyclic residue or a fused heterocyclic system.

15. A compound according to claim 14 in which M is copper.

16. A compound according to claim 14 in which n ranges from 1.0 to 3.0.

* * * * *